United States Patent
Ohshima

(10) Patent No.: US 6,404,757 B1
(45) Date of Patent: Jun. 11, 2002

(54) RECEPTION METHOD AND APPARATUS IN CDMA SYSTEM

(75) Inventor: Manabu Ohshima, Yokohama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/215,615

(22) Filed: Dec. 17, 1998

(30) Foreign Application Priority Data

Dec. 17, 1997 (JP) ............................................. 9-363984

(51) Int. Cl.[7] .................................................. H04J 3/00
(52) U.S. Cl. ...................................... 370/342; 375/134
(58) Field of Search ................................. 370/342, 343, 370/344, 320, 335, 328, 441, 431, 437, 345, 314, 346, 347; 375/130, 133, 135, 136, 134; 455/130, 63

(56) References Cited

U.S. PATENT DOCUMENTS 5,504,774 A * 4/1996 Takai .......................... 375/204
5,652,764 A * 7/1997 Kanzaki ...................... 375/200
6,021,125 A * 2/2000 Sakoda ........................ 370/345
6,272,167 B1 * 8/2001 Ono ............................ 375/144

FOREIGN PATENT DOCUMENTS

| JP | 7-221700 | 8/1995 |
| JP | 7-321702 | 12/1995 |
| JP | 9-135193 | 5/1997 |

* cited by examiner

Primary Examiner—Douglas Olms
Assistant Examiner—Ricardo M. Pizarro
(74) Attorney, Agent, or Firm—Scully, Scott, Murphy & Presser

(57) ABSTRACT

A code division multiple access system includes the steps of sequentially generating reception symbols by de-spreading a reception signal, generating a threshold on the basis of an average amplitude obtained by averaging amplitudes of a predetermined number of reception symbols, generating a weighted reception symbol by multiplying an amplitude of the reception symbol by a weighting coefficient, and sequentially selecting one of the reception symbol and the weighted reception symbol as a reception symbol of the reception signal in accordance with a result obtained by comparing the amplitude of the reception symbol and the threshold.

15 Claims, 3 Drawing Sheets

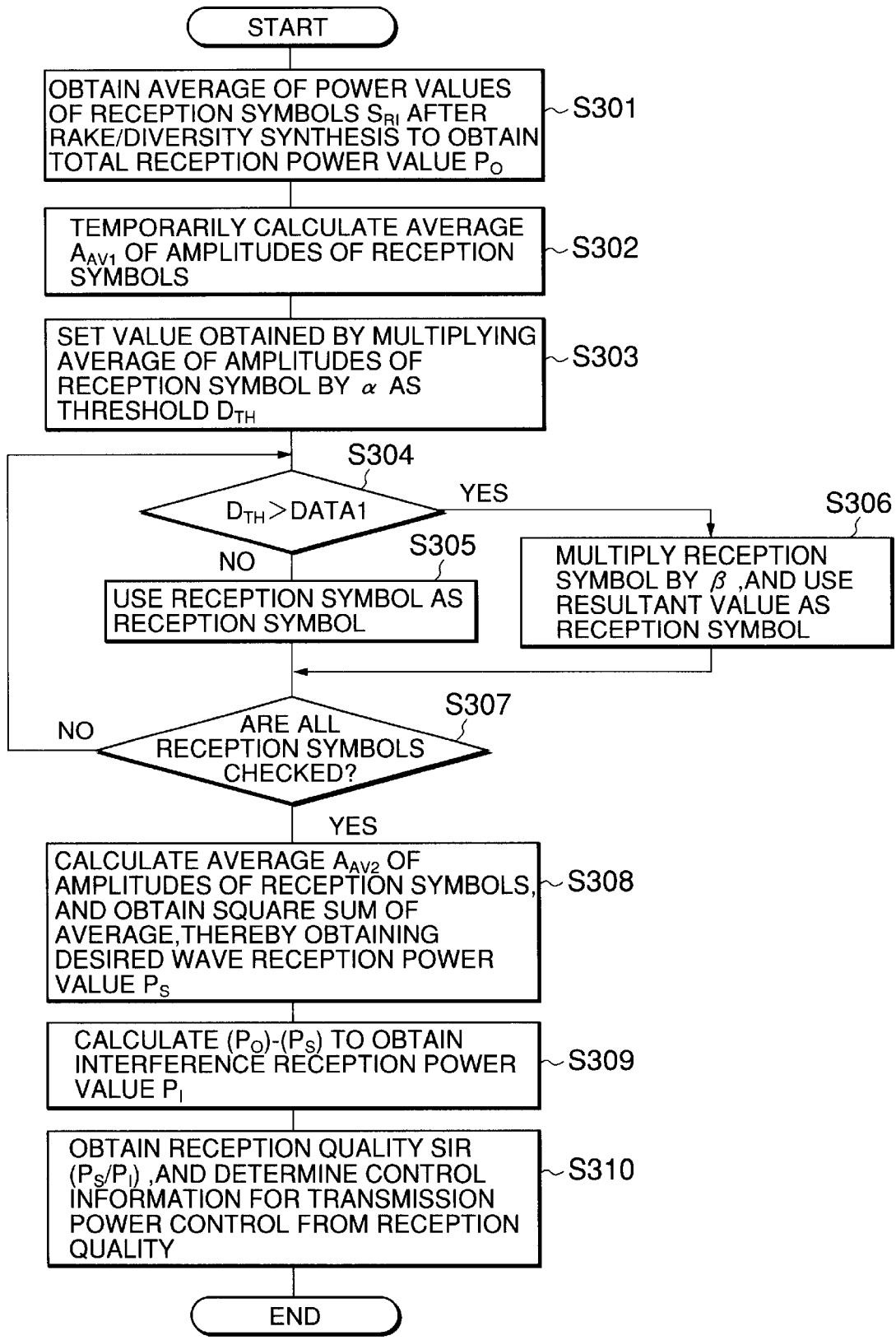

RECEPTION METHOD AND APPARATUS IN CDMA SYSTEM

BACKGROUND OF THE INVENTION

1. Field of the Invention

The present invention relates to a CDMA (Code Division Multiple Access) system and, more particularly, to a reception method, a reception quality estimation method, a transmission power control method, and transmitting/receiving apparatus in a CDMA system.

2. Description of the Related Art

RAKE/diversity reception techniques for high-quality reception under a multipath fading environment, transmission power control (TPC) techniques for lessening the problems associated with distance and suppressing interference, and the like are indispensable techniques for a digital mobile/portable telephone system (cellular system) using the CDMA scheme.

As a technique for performing transmission power control with high precision, a mobile unit for measuring the reception power, of a known pilot signal and controlling the transmission power on the basis of the measured value is disclosed in Japanese Unexamined Patent Publication No. 7-221700.

A receiving apparatus that allows stable transmission power control even with a low signal-to-interference ratio is disclosed in Japanese Unexamined Patent Publication No. 9-135193. In this receiving apparatus, a desired signal power is obtained by performing in-phase vector addition of the pilot signals (unique words) contained in the de-spread reception signals. Likewise, an interference signal power is obtained by averaging the error powers between the pilot signals and the desired signal power. The value obtained by multiplying the interference signal power by two different coefficients is then compared with the desired signal power to determine the signal-to-interference power ratio. The resultant data is used for operation speed control or transmission power control on a chip synchronization circuit.

In addition, a receiving apparatus capable of reducing errors in demodulated data even in the presence of interference due to variations or fluctuations in transmission power level from a transmission station is disclosed in Japanese Unexamined Patent Publication No. 7-321702. This receiving apparatus uses a reception method of correcting an estimated current symbol value by using the average of a plurality of estimated symbol values obtained from a corrlator in the past.

In either of the above conventional techniques, however, when the reception level varies due to fading or the like, and the reception state deteriorates, the average of the amplitudes of received symbols cannot be accurately obtained owing to reception errors. For this reason, an error occurs in measurement of a desired reception power, and a signal-to-interference power ratio cannot be accurately estimated. As a result, transmission power control and the like cannot be properly performed.

SUMMARY OF THE INVENTION

The present invention has been made in consideration of the above situation in the prior art and, has as its object to provide a method and apparatus which can improve reception quality estimation precision and stabilize communication even when a reception state deteriorates and a reception error occurs.

In order to achieve the above object, according to the principal aspect of the present invention, there are provided a method and apparatus for sequentially generating reception symbols by de-spreading a reception signal, generating a threshold on the basis of an average amplitude obtained by averaging amplitudes of a predetermined number of reception symbols, generating a weighted reception symbol by multiplying an amplitude of the reception symbol by a weighting coefficient, and sequentially selecting one of the reception symbol and the weighted reception symbol as a reception symbol of the reception signal in accordance with a result obtained by comparing the amplitude of the reception symbol and the threshold. According to the method and apparatus of the present invention, it is determined, on the basis of the threshold obtained from reception symbols, whether to weight a reception symbol, and reception quality estimation and transmission power control are performed by using reception symbols selected in this manner.

According to the present invention, even when reception state deteriorates and a reception error occurs, reception quality can be accurately estimated, and proper transmission power control can be stably performed.

The above and many other subjects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIG. 3 is a flow chart showing a reception quality estimation method according to an embodiment of the present invention.

DETAILED DESCRIPTION OF THE PREFERRED EMBODIMENT

A preferred embodiment of the present invention will be described in detail with reference to the accompanying drawings.

Figure 1:
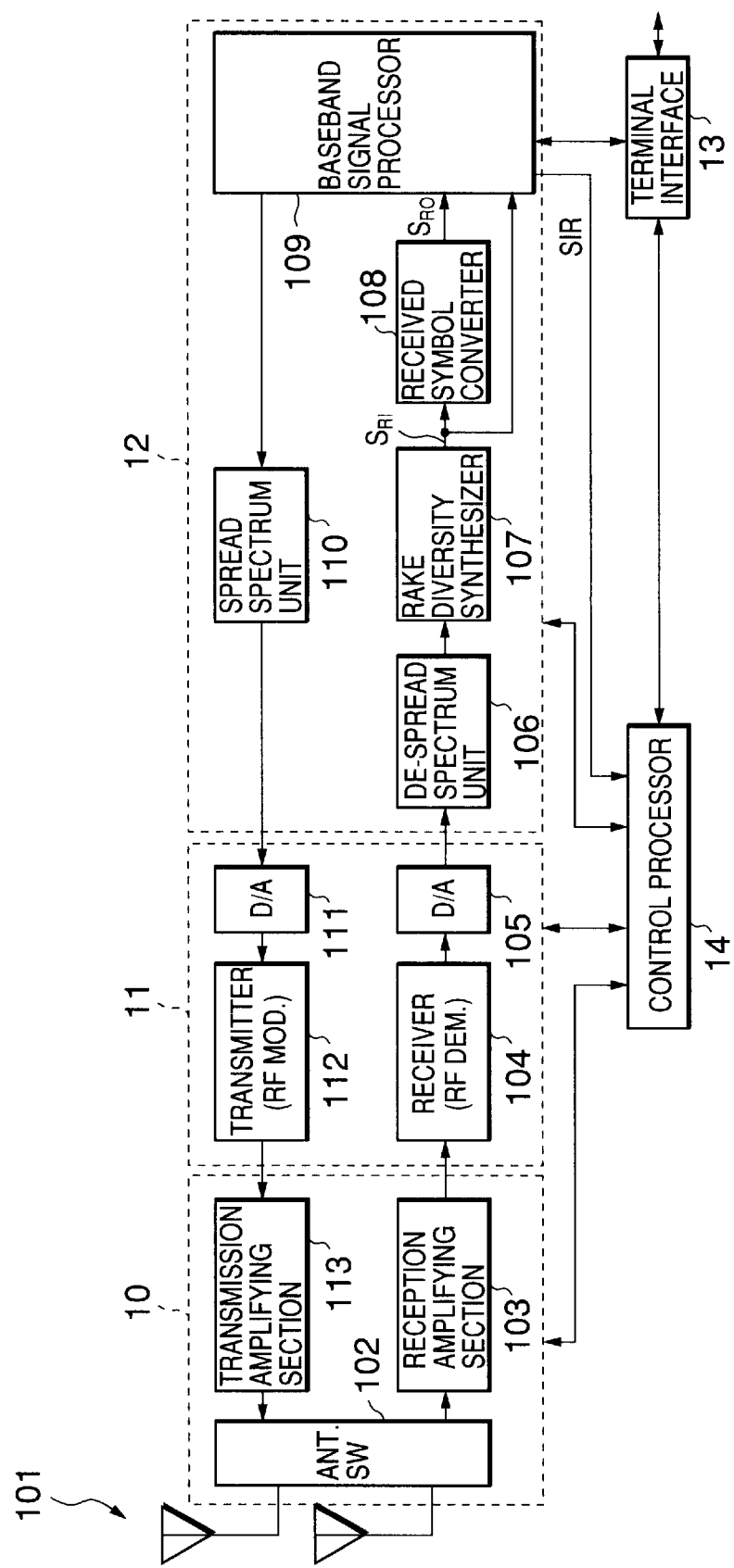
FIG. 1 is a block diagram schematically showing a receiving apparatus according to an embodiment of the present invention.

FIG. 1 is a block diagram showing a mobile unit in a digital mobile/portable telephone CDMA system according to an embodiment of the present invention. The mobile unit of this embodiment is constituted by an RF amplifying section 10, a radio section 11, a baseband signal processing section 12, a terminal interface 13, and a control processor 14. The control processor 14 controls the overall operation of the mobile unit in accordance with the programs stored in a memory (not shown).

In the antenna diversity reception system of the mobile unit, antennas 101 for two systems are connected to a reception amplifying section 103 through an antenna switch 102 of the RF amplifying section 10. The reception amplifying section 103 comprises a low-noise amplifier (LNA) for amplifying a received RF signal. The amplified received RF signal is output to a receiver 104 of the radio section 11 to be subjected to quasi-synchronous detection. The baseband reception signal obtained by quasi-synchronous detection is converted into a digital signal by an A/D converter 105. The digital signal is then output to the baseband signal processing section 12.

The baseband reception signal is de-spread by a de-spread spectrum unit 106 of the baseband signal processing section 12, and estimated values $S_{RI}$ of the reception symbols are sequentially generated by a RAKE diversity synthesizer 107 for implementing a diversity handover synthesis function. Each estimated value $S_{RI}$ of the reception signal obtained in this manner is converted by a received symbol converter 100 such that the calculation precision for the average of the amplitudes of reception symbols improves. Each converted reception symbol $S_{RO}$ is output to a baseband signal processor 109.

As will be described later, the baseband signal processor 109 receives the estimated reception symbol values $S_{RI}$ and the converted reception symbols $S_{RO}$, and calculates the average of the amplitudes of the reception symbols. The baseband signal processor 109 then calculates a signal-to-interference power ratio SIR as a reception quality on the basis of the amplitude average, and outputs it to the control processor 14. The control processor 14 performs transmission power control on the RF amplifying section 10 on the basis of the magnitude of the signal-to-interference power ratio SIR. In addition, the baseband signal processor 109 performs signal processing such as error correction decoding and data separation with respect to each reception symbol received from the received symbol converter 108.

The reception data obtained in this manner is output as speech from, for example, the receiver of a telephone handset through the terminal interface 13, or output to an information terminal connected to the terminal interface 13.

Transmission data is input to the baseband signal processor 109 through the terminal interface 13 to be subjected to error correction coding and framing. The resultant data is spread-modulated by a spread spectrum unit 110 and is output to the radio section 11. The spread-modulated baseband transmission signal is converted into an analog signal by a D/A converter 111 of the radio section 11. The analog signal is quadrature-modulated by a transmitter 112 to be output as an RF transmission signal to a transmission amplifying section 113 of the RF amplifying section 10. The RF transmission signal power-amplified by the transmission amplifying section 113 is sent from the antennas 101 through the antenna switch 102. The gain of the transmission amplifying section 113 is controlled by the control processor 14 in accordance with the signal-to-interference power ratio SIR of the reception signal.

Figure 2:
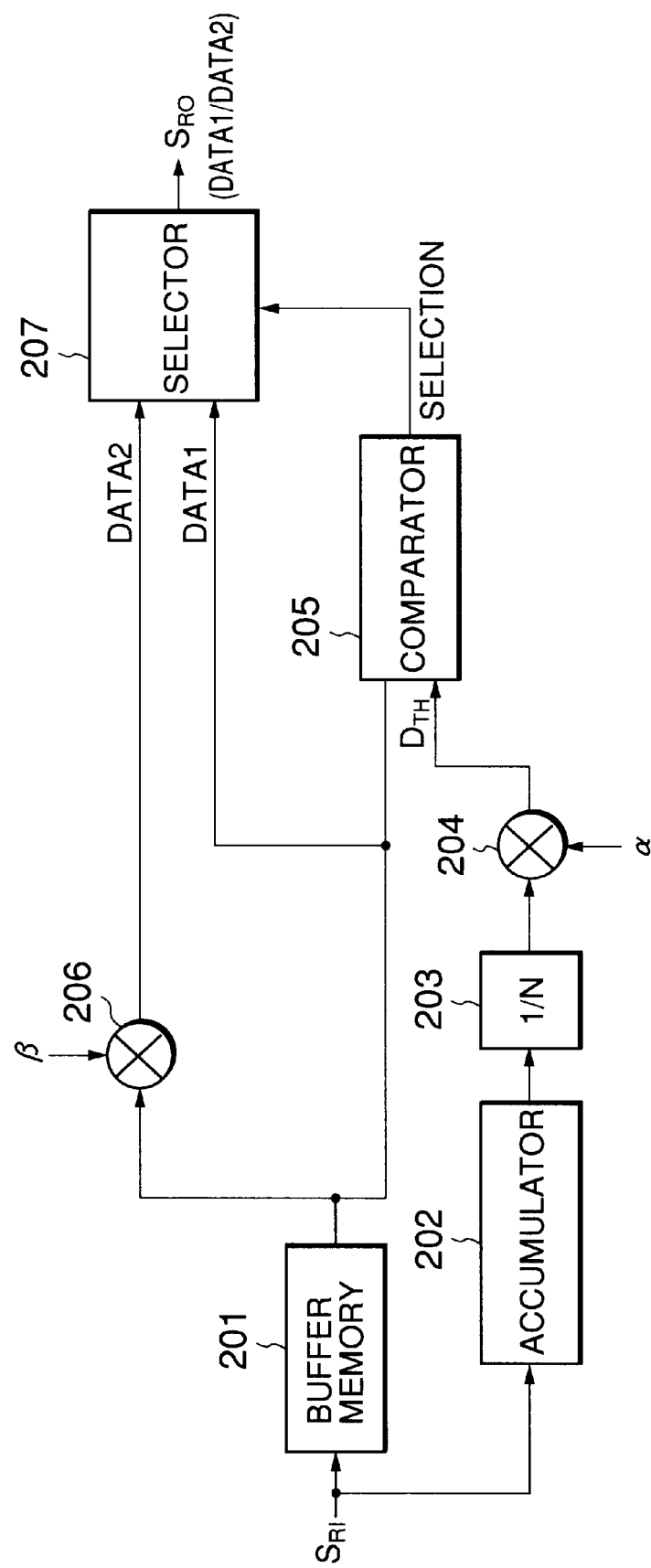
FIG. 2 is a block diagram schematically showing a reception symbol converter used in the receiving apparatus of the present invention.

FIG. 2 is a block diagram showing an example of the reception symbol converter in FIG. 1. Although the received symbol converter 108 is implemented by a program in the baseband signal processor 109, the functional arrangement of the converter will be described below with reference to FIG. 2.

In the received symbol converter 108 in FIG. 2, the reception symbols $S_{RI}$ sequentially input from the RAKE diversity synthesizer 107 are stored in a buffer memory 201 by N (N is a predetermined integer) symbols. The identical reception symbols $S_{RI}$ are sequentially accumulated by an accumulator 202. The resultant value is divided by a 1/N divider 203 to obtain the average of the amplitudes of the reception symbols. A multiplier 204 multiplies the average amplitude by a given coefficient a to generate a threshold $D_{TH}$, and outputs it to a comparator 205. If, for example, $\alpha=¼$, a level corresponding to ¼ the average of the amplitudes of the reception symbols is set as a threshold.

The reception symbols $S_{RI}$ stored in the buffer memory 201 are sequentially read out, and each symbol is output as a reception symbol DATA1 to the comparator 205 and a selector 207 and multiplied by a given coefficient β by a multiplier 206. The resultant data is output as a weighted reception symbol DATA2 to the selector 207. For example, weighting coefficient $\beta=-½$ is set. The comparator 205 compares the reception symbol DATA1 with the threshold $D_{TH}$, and outputs the comparison result as a selection control signal to the selector 207. The selector 207 selects either the reception symbol DATA1 or the weighted reception symbol DATA2 in accordance with the comparison result, and outputs the selected symbol as the converted reception symbol $S_{RO}$ to the baseband signal processor 109. More specifically, if the amplitude of the reception symbol DATA1 is smaller than the threshold $D_{TH}$, the selector 207 selects the weighted reception symbol DATA2. If the amplitude of the reception symbol DATA1 is equal to or larger than the threshold $D_{TH}$, the selector 207 selects the reception symbol DATA1.

The amplitude of a reception symbol used to calculate the reception quality SIR changes depending on the magnitude of the amplitude of the reception symbol DATA1. In other words, if the amplitude of the reception symbol DATA1 is smaller than the threshold $D_{TH}$, i.e, the reception state has deteriorated, the reception symbol DATA2 obtained by weighting the reception symbol DATA1 by the coefficient β is used to calculate the reception quality SIR. If the reception state has not deteriorated much, the reception symbol DATA1 is used without any change to calculate the reception quality SIR. With this operation, proper transmission power control can be performed regardless of the reception state, thereby realizing stable communication.

FIG. 3 is a flow chart showing a reception quality estimation method according to an embodiment of the present invention. Reception quality estimation in this embodiment is executed by the baseband signal processor 109 including the received symbol converter 108.

The baseband signal processor 109 receives the reception symbols $S_{RI}$ sequentially output from the RAKE diversity synthesizer 107, calculates the power of each symbol, and obtains the average of the powers, thereby calculating a total reception power value $P_O$ (step S301). The baseband signal processor 109 then obtains an average amplitude $A_{AV1}$, of the reception symbols $S_{RI}$ (step S302), and sets the value obtained by multiplying the average amplitude $A_{AV1}$, by a (e.g., $\alpha=¼$) as the threshold $D_{TH}$ (step S303).

The baseband signal processor 109 compares each reception symbol with the set threshold $D_{TH}$ (step S304). If the amplitude of the reception symbol is equal to or larger than the set threshold $D_{TH}$, the baseband signal processor 109 uses the symbol without any change (step S305). If the amplitude of the reception symbol is smaller than the threshold $D_{TH}$, the baseband signal processor 109 uses the weighted reception symbol obtained by multiplying the symbol by β(e.g., $\beta=-½$) as a reception symbol (step S306). Steps S304 to S306 are repeated for all the reception symbols to obtain the converted reception symbols $S_{RO}$ (YES in step S307).

The baseband signal processor 109 calculates an average amplitude $A_{AV2}$ of the reception symbols $S_{RO}$ obtained in this manner, and obtains the square sum of the average amplitude, thereby obtaining a desired wave reception power value $P_S$ (step S308). The baseband signal processor 109 then calculates an interference wave reception power value $P_I$ by subtracting the desired wave reception power value $P_S$ from the total reception power value $P_O$ that has already been obtained (step S309). The baseband signal processor 109 can obtain the signal-to-interference power ratio SIR estimating reception quality from the desired wave reception power value $P_S$ and the interference wave reception power value $P_I$. This reception quality SIR is output from the baseband signal processor 109 to the control processor 14 to determine control information for transmission power control (step S310).

As described above, since the average amplitude $A_{AV2}$ is calculated by using the reception symbols $S_{RO}$ converted by the received symbol converter 108, and the desired wave reception power value $P_S$ is obtained, the influences of a deterioration in reception state can be reduced, and proper transmission power control can be stably performed.

Note that the coefficients α and β used in the received symbol converter 108 can be variable parameters that are properly set through the control processor 14 or the terminal interface 13. By using such variable parameters, changes in hardware and software can be minimized, and the average of the amplitudes of reception symbols can be obtained more accurately. This allow more accurate reception quality estimation. In addition, by setting the weighting coefficient β to a negative value, e.g., β=–½, the influences of reception symbols whose amplitudes are smaller than the threshold on the variance of reception symbols can be further suppressed. For example, errors in calculation of interference wave reception power can be further suppressed.

The above embodiment has exemplified the digital mobile/portable telephone CDMA system. Obviously, however, the received symbol converter 108 is used for a reception apparatus in a CDMA system, and can be applied to a receiving apparatus in a base station as well as the receiving apparatus of a mobile unit.

What is claimed is:

1. A code division multiple access system comprising a reception process having the steps of:
   (a) sequentially generating reception symbols by de-spreading a reception signal;
   (b) generating a threshold on the basis of an average amplitude obtained by averaging amplitudes of a predetermined number of reception symbols;
   (c) generating a weighted reception symbol by multiplying an amplitude of the reception symbol by a weighting coefficient; and
   (d) sequentially selecting one of the reception symbol and the weighted reception symbol as a reception symbol of the reception signal in accordance with a result obtained by comparing the amplitude of the reception symbol and the threshold;
   wherein the threshold is generated by multiplying the average amplitude by a coefficient less than 1, and at least one of the weighting coefficient and the coefficient less than 1 is variable.

2. A system according to claim 1, wherein the selection step comprises selecting the reception symbol when the amplitude of the reception symbol is not less than the threshold, and selecting the weighted reception symbol if the amplitude of the reception symbol is smaller than the threshold.

3. In a code division multiple access system, a reception quality estimation process comprising the steps of:
   (a) generating a total reception power value from power values of reception symbols sequentially obtained by de-spreading a reception signal;
   (b) generating a threshold on the basis of an average amplitude obtained by averaging amplitudes of a predetermined number of reception symbols;
   (c) generating a weighted reception symbol by multiplying an amplitude of the reception symbol by a weighting coefficient;
   (d) sequentially selecting one of the reception symbol and the weighted reception symbol as a reception symbol of the reception signal in accordance with a result obtained by comparing the amplitude of the reception symbol and the threshold;
   (e) generating a desired wave reception power value by using an amplitude of the selected reception symbol; and
   (f) estimating a reception quality on the basis of the total reception power value and the desired wave reception power value.

4. A system according to claim 3, wherein the selection step comprises selecting the reception symbol when the amplitude of the reception symbol is not less than the threshold, and selecting the weighted reception symbol if the amplitude of the reception symbol is smaller than the threshold.

5. A system according to claim 3, wherein the threshold is generated by multiplying the average amplitude by a coefficient less than 1, and at least one of the weighting coefficient and the coefficient less than 1 is variable.

6. In a code division multiple access system, a transmission power control process comprising the steps of:
   (a) generating a total reception power value from power values of reception symbols sequentially obtained by de-spreading a reception signal;
   (b) generating a threshold on the basis of an average amplitude obtained by averaging amplitudes of a predetermined number of reception symbols;
   (c) generating a weighted reception symbol by multiplying an amplitude of the reception symbol by a weighting coefficient;
   (d) sequentially selecting one of the reception symbol and the weighted reception symbol as a reception symbol of the reception signal in accordance with a result obtained by comparing the amplitude of the reception symbol and the threshold;
   (e) generating a desired wave reception power value by using an amplitude of the selected reception symbol;
   (f) estimating a reception quality on the basis of the total reception power value and the desired wave reception power value; and
   (g) controlling transmission power on the basis of the estimated reception quality.

7. A system according to claim 6, wherein the selection step comprises selecting the reception symbol when the amplitude of the reception symbol is not less than the threshold, and selecting the weighted reception symbol if the amplitude of the reception symbol is smaller than the threshold.

8. A system according to claim 6, wherein the threshold is generated by multiplying the average amplitude by a coefficient less than 1, and at least one of the weighting coefficient and the coefficient less than 1 is variable.

9. A code division multiple access system comprising a receiving apparatus having:
   (a) RAKE diversity receiving means for sequentially generating reception symbols by de-spreading a reception signal;
   (b) reception symbol conversion means for generating a threshold on the basis of an average amplitude obtained by averaging amplitudes of a predetermined number of reception symbols, generating a weighted reception symbol by multiplying the amplitude of the reception symbol by a weighting coefficient, and generating a converted reception symbol by sequentially selecting one of the reception symbol and the weighted reception symbol in accordance with a result obtained by comparing the amplitude of each of the reception symbols and the threshold; and (c) signal processing means for calculating a signal-to-interference power ratio by using the converted reception symbol.

10. A system according to claim 9, wherein said reception symbol conversion means selects the reception symbol when the amplitude of the reception symbol is not less than the threshold, and selects the weighted reception symbol if the amplitude of the reception symbol is smaller than the threshold.

11. A system according to claim 9, wherein the threshold is generated by multiplying the average amplitude by a coefficient less than 1, and at least one of the weighting coefficient and the coefficient less than 1 is variable.

12. A code division multiple access system comprising a transmitting/receiving apparatus having:

(a) transmitting means for generating a transmission signal by spreading transmission symbols, power-amplifying the transmission signal, and transmitting the signal;

(b) RAKE diversity receiving means for sequentially generating reception symbols by de-spreading a reception signal;

(c) reception symbol conversion means for generating a threshold on the basis of an average amplitude obtained by averaging amplitudes of a predetermined number of reception symbols, generating a weighted reception symbol by multiplying the amplitude of the reception symbol by a weighting coefficient, and generating a converted reception symbol by sequentially selecting one of the reception symbol and the weighted reception symbol in accordance with a result obtained by comparing the amplitude of each of the reception symbols and the threshold; and (d) control means for calculating a signal-to-interference power ratio by using the converted reception symbol, and performing transmission power control on said transmitting means in accordance with a magnitude of the signal-to-interference power ratio.

13. A system according to claim 12, wherein said reception symbol conversion means selects the reception symbol when the amplitude of the reception symbol is not less than the threshold, and selects the weighted reception symbol if the amplitude of the reception symbol is smaller than the threshold.

14. A system according to claim 12, wherein the threshold is generated by multiplying the average amplitude by a coefficient less than 1, and at least one of the weighting coefficient and the coefficient less than 1 is variable.

15. A code division multiple access system comprising a recording medium which stores a reception control program having the steps of:

(a) generating a total reception power value from power values of reception symbols sequentially obtained by de-spreading a reception signal;

(b) generating a threshold on the basis of an average amplitude obtained by averaging amplitudes of a predetermined number of reception symbols;

(c) generating a weighted reception symbol by multiplying an amplitude of the reception symbol by a weighting coefficient;

(d) sequentially selecting one of the reception symbol and the weighted reception symbol as a reception symbol of the reception signal in accordance with a result obtained by comparing the amplitude of the reception symbol and the threshold;

(e) generating a desired wave reception power value by using an amplitude of the selected reception symbol; and (f) estimating a reception quality on the basis of the total reception power value and the desired wave reception power value.

* * * * *